United States Patent
Yamamoto et al.

(10) Patent No.: US 7,374,262 B2
(45) Date of Patent: May 20, 2008

(54) METHOD FOR MANUFACTURING PATTERN-FORMING BODY AND PATTERN MANUFACTURING APPARATUS

(75) Inventors: Manabu Yamamoto, Tokyo (JP); Masashi Nishiyama, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 452 days.

(21) Appl. No.: 10/472,713

(22) PCT Filed: Nov. 27, 2002

(86) PCT No.: PCT/JP02/12385

§ 371 (c)(1),
(2), (4) Date: Sep. 22, 2003

(87) PCT Pub. No.: WO03/048818

PCT Pub. Date: Jun. 12, 2003

(65) Prior Publication Data

US 2004/0201818 A1    Oct. 14, 2004

(30) Foreign Application Priority Data

Dec. 6, 2001 (JP) ............................. 2001-372310

(51) Int. Cl.
*B41J 3/00* (2006.01)

(52) U.S. Cl. ................. 347/2; 347/9; 347/41

(58) Field of Classification Search ............... 347/2, 347/9, 14, 33, 40–43; 430/7; 349/187
See application file for complete search history.

(56) References Cited

U.S. PATENT DOCUMENTS

| 5,847,723 A | * | 12/1998 | Akahira et al. ............... 347/14 |
| 6,258,405 B1 | | 7/2001 | Yamaguchi |
| 6,277,529 B1 | * | 8/2001 | Marumoto et al. ............ 430/7 |
| 6,364,450 B1 | * | 4/2002 | Yamaguchi et al. .......... 347/33 |
| 6,450,635 B1 | | 9/2002 | Okabe et al. |

FOREIGN PATENT DOCUMENTS

| EP | 791841 A2 | 8/1997 |
| EP | 1008873 A1 | 6/2000 |
| JP | 8-25626 A | 1/1996 |
| JP | 2000-171629 A | 6/2000 |
| JP | 2000-249821 A | 9/2000 |
| JP | 2001-074928 | 3/2001 |
| JP | 2001-183514 A | 7/2001 |

* cited by examiner

Primary Examiner—Lam Son Nguyen
(74) Attorney, Agent, or Firm—Ladas & Parry LLP

(57) ABSTRACT

The main object of the present invention is to form an even pattern. In order to achieve the object, in the present invention, patterns P1 to P6 formed on a substrate 400 are formed by liquid droplets discharged from a piezoelectric driving type head unit 300. The size of each liquid droplet discharged from each orifice 300-1 to 300-n differs depending on the mechanical and electric characteristics. The liquid droplets discharged form each orifice 300-1 to 300-n are thinned out so as to have the liquid droplet amount per unit area to be impacted on each pattern p1 to P6 equally.

3 Claims, 10 Drawing Sheets

METHOD FOR MANUFACTURING PATTERN-FORMING BODY AND PATTERN MANUFACTURING APPARATUS

CROSS REFERENCE TO RELATED APPLICATION

This application is a U.S. National Phase of International Patent Application serial No. PCT/JP02/12385, filed Nov. 27, 2002 which claims priority of Japanese Patent Application serial No. 2001-372310, filed Dec. 6, 2001.

TECHNICAL FIELD

The present invention relates to a pattern forming method, capable of forming a high definition pattern, and a pattern producing apparatus.

BACKGROUND ART

A color liquid crystal display comprises color filters corresponding to a color to be displayed per pixel. As a method for manufacturing a color filter, conventionally, a pigment dispersion method of repeating a photolithography process for a plurality of times, or the like has been used. Recently, for the main purpose of cost reduction, a method of using an ink jet apparatus attracts the attention.

The pattern pitch of a color filter tends to be finer and finer according to the high definition of the color liquid crystal displays. The amount of ink discharged from the ink jet apparatus is a few pico liter, and thus it is extremely small. In order to form a pattern of a small line width, it is necessary to have a small discharging amount. Also in this regard, the ink jet apparatus is preferable for the manufacturing a color filter.

According to the ink jet apparatus, a color filter pattern is produced, in general, by using a head unit provided with a plurality of piezoelectric driving type heads.

However, due to mechanical and electric variation of each piezoelectric driving type heads, the liquid droplet amount discharged form each piezoelectric driving type head is uneven although the same driving pulse is applied. If the ink discharging amount is not even, the thickness of the coloring layer or the like constituting the color filter becomes uneven.

That is, when a color filter is manufactured by using the conventional ink jet apparatus, derived form the uneven ink discharging amount, there is a problem that unevenness of the display color of the color filter is generated.

DISCLOSURE OF THE INVENTION

The present invention has been achieved in view of the above-mentioned problems, and the problem to be solved is to provide an ink jet apparatus and a pattern forming method, suitable for forming an even pattern even when the liquid droplet amount discharged from each piezoelectric driving type head is uneven.

In the present invention, in order to solve the above mentioned problems, a method for manufacturing a pattern forming body, for forming a pattern on a substrate by discharging a plurality of liquid droplets to the substrate from each head while changing the relative position of a head unit with a plurality of integrated heads and the substrate, wherein a pattern of a lyophilic area, where the liquid droplets wet and spread, corresponding to a pattern to be formed is formed on the substrate surface, and the discharging of the liquid droplets of the each head is thinned out according to a predetermined rule such that the liquid droplet amount per unit area to be impacted on the lyophilic area is made even, is provided.

In the invention, since the liquid droplets discharged from each head is thinned out so as to make the liquid droplet amount even per unit area, although the discharging amount per one shot of each head differs, an even pattern can be formed. Moreover, since the lyophilic area, where the liquid droplets wet and spread, are formed preliminarily on the substrate, although the liquid droplet discharge is thinned out, the impacted liquid droplets on the adjacent parts wet and spread to the thinned out part, the solution can be spread evenly in a pattern so that unevenness cannot be generated in the pattern. Therefore, an extremely accurate pattern can be formed inexpensively.

Moreover, at the time, it is preferable that the each head discharges the liquid droplets based on the discharging position information, preliminarily determined for the each head, showing the position on the lyophilic area of the liquid droplets to be impacted. Since the discharging position information determines the position for each head on the lyophilic area of the liquid droplets to be impacted, by setting the discharging position information based on the discharging amount difference between the heads, the discharging amount difference between the heads can be cancelled so as to form an even pattern.

Furthermore, it is preferable that the discharging position information is determined such that the position of thinning out the liquid droplet discharge is dispersed substantially even in the lyophilic area. Although the liquid droplets wet and spread in the lyophilic area, the range has certain limitation. Therefore, when the areas without the liquid droplet discharge are provided continuously, unevenness may be generated in a pattern. However, according to the present invention, since the position of thinning out the liquid droplet discharge is determined so as to be dispersed substantially even in the lyophilic area, the liquid droplets can be dispersed evenly in the pattern.

Here, the discharging position information preferably designates dots to execute the liquid droplet discharge out of the plurality of dots positioned equally on the lyophilic area, and is determined based on the volume of the pattern to be formed and the discharging amount of the each head. According to the present invention, since the existence or absence of the discharge is determined for each dot, the discharging amount difference between the dots can be cancelled by thinning out the discharge so that an even pattern can be formed.

Furthermore, the discharging position information can be produced by calculating the number of dots in the pattern based on the smallest discharging amount out of the discharging amounts of the each head and the volume of the pattern to be formed, calculating the average value of the discharging amounts of the each head, determining the existence or absence of the discharge for each dot based on the average value, calculating each difference value of the discharging amount of the each head and the average value, and adjusting the existence or absence of the discharge for each dot based on the difference value. Since most of the discharging amounts of the each head are provided in the vicinity of the average value, according to the present invention, the discharging position information can be produced efficiently.

Moreover, the discharging position information can be provided by calculating the number of dots in the pattern based on the smallest discharging amount out of the discharging amounts of the each head and the volume of the pattern to be formed, calculating each difference value of the discharging amount of each head and the smallest discharging amount, and determining the existence or absence of the discharge for each dot based on the difference value. According to the present invention, since the existence or absence of the discharge is determined for each dot based on the smallest discharging amount, the discharging position information can be produced efficiently.

Here, it is preferable that the discharging position information is determined so as to thin out the liquid droplet discharge at the end part of the lyophilic area. For example, when the discharge is executed on the lyophilic area to form a linear pattern, the film thickness tends to be thicker at the both end parts of the line. Therefore, by thinning out the liquid droplet discharge at the end part of the lyophilic area so as not to execute the discharge to the end part, a pattern can be formed with an even film thickness over the entire surface.

In the invention, it is preferable that the pattern of the lyophilic area formed on the substrate surface is formed by using a wettability variable layer, capable of changing the wettability by a function of a photocatalyst accompanied by the energy pattern irradiation, and irradiating energy in a pattern onto the wettability variable layer. By forming the lyophilic area on the wettability variable layer accordingly, a high definition lyophilic area can be formed easily by the energy pattern irradiation. Thereby, a pattern forming body having a high definition pattern, such as a color filter, can be manufactured.

At the time, the wettability variable layer may be a wettability changeable layer having the wettability changed by being contacted to a photocatalyst processing layer containing a photocatalyst, or being energy irradiated after located with a gap of 200 μm or less. In this case, since the photocatalyst does not remain in the pattern forming body, it is advantageous in that the physical property change of the pattern forming body can hardly be generated by the time passage.

In contrast, the wettability variable layer may be a photocatalyst containing layer comprising a photocatalyst and a binder, having the wettability changed so as to lower the contact angle with a liquid by the function of the photocatalyst accompanied by the energy irradiation. By using the photocatalyst containing layer as the wettability variable layer, a high definition pattern can be formed only by irradiating energy.

Moreover, it is preferable that the photocatalyst is one or two or more substances selected from a titanium oxide ($TiO_2$), a zinc oxide (ZnO), a tin oxide ($SnO_2$), a strontium titanate ($SrTiO_3$), tungsten oxide ($WO_3$), bismuth oxide ($Bi_2O_3$), and an iron oxide ($Fe_2O_3$). In particular, it is preferable that the photocatalyst is a titanium oxide ($TiO_2$). The band gap energy of a titanium oxide is high so that it is effective as a photocatalyst, it is chemically stable without the toxicity, and it can be obtained easily so that a wettability variable layer using a titanium oxide can be used preferably, and thus detection of the wettability pattern defect is highly required.

At the time, it is preferable that the binder or the wettability changeable layer is a layer containing an organo polysiloxane as a hydrolyzed condensation product or a co-hydrolyzed condensation product of one or two or more kinds of silicon compounds represented by $Y_nSiX_{(4-n)}$ (here, Y is an alkyl group, a fluoro alkyl group, a vinyl group, an amino group, a phenyl group or an epoxy group, and X is an alkoxyl group, or a halogen. N is an integer from 0 to 3). By using such a material, the wettability change accompanied by the energy irradiation can be provided drastically, and thus it is preferable for the subsequent pattern formation.

Next, the present invention provides a pattern producing apparatus for forming a pattern on a substrate by discharging a plurality of liquid droplets from each head to the substrate while changing relative position of a head unit with a plurality of integrated heads and the substrate, comprising: a stage for placing the substrate, a position adjusting mechanism for adjusting the relative positional relationship between the stage and the head unit, and a control section for discharging the liquid droplets from the each head while thinning out the liquid droplet discharge of the each head according to a predetermined rule such that the liquid droplet amount per unit area to be impacted on the substrate is made even between the each head.

According to the pattern producing apparatus, the liquid droplets are discharged from each head while changing the relative position between the head unit and the substrate by the position controlling mechanism. Since the liquid droplet discharge of each head is thinned out at the time so that the liquid droplet amount per unit area to be impacted on the substrate is made even between the each heads, an even pattern can be formed although the discharging amount per one shot of each head differs.

Here, it is preferable that the control section comprises a memory section for storing discharging position information, preliminarily determined for the each head, showing the position on the substrate of the liquid droplets to be impacted so that the liquid droplet discharge from the each head is controlled based on the discharging position information read out from the memory section. Since the discharging position information determines the position on the substrate of the liquid droplets to be impacted for each head, by setting the discharging position information based on the discharging amount difference between the heads, the discharging amount difference between the heads can be cancelled so as to form an even pattern.

Furthermore, it is preferable that the discharging position information is determined such that the position of thinning out the liquid droplet discharge is dispersed substantially even in the pattern formed on the substrate. According to the present invention, since the position of thinning out the liquid droplet discharge is determined so as to be dispersed substantially even in the pattern, the liquid droplets can be dispersed even in the pattern so that a more even pattern can be formed.

Additionally, it is preferable that the head unit comprises a setting section capable of setting whether the discharging operation is valid or invalid for the each head, and the control section produces setting information for controlling the setting section based on the discharging position information and supplies the same to the setting section. More specifically, it is preferable that the each head comprises a common piezoelectric element, a common electrode and an individual electrode each corresponding to the each head are formed on the piezoelectric element, the control section comprises a driving pulse producing section for producing a driving pulse common to the each head and supplying the same to the common electrode, and the setting section controls whether the each individual electrodes is to be grounded or opened based on the setting information.

Furthermore, the present invention provides a method for manufacturing a color filter, comprising a process of, a pattern of a coloring layer forming coating solution is formed by using the above mentioned method for manufacturing a pattern forming body, and then curing the same to form a coloring layer. According to the present invention, a high quality color filter with extremely even coloring layer film thickness can be manufactured.

As explained in the above, according to the present invention, an even pattern can be formed although the discharging amount differs between the each head.

BEST MODE FOR CARRYING OUT THE INVENTION

Hereinafter, an embodiment of the present invention will be explained with reference to the drawings.

1. Mechanical Configuration of the Discharging System

Figure 1:
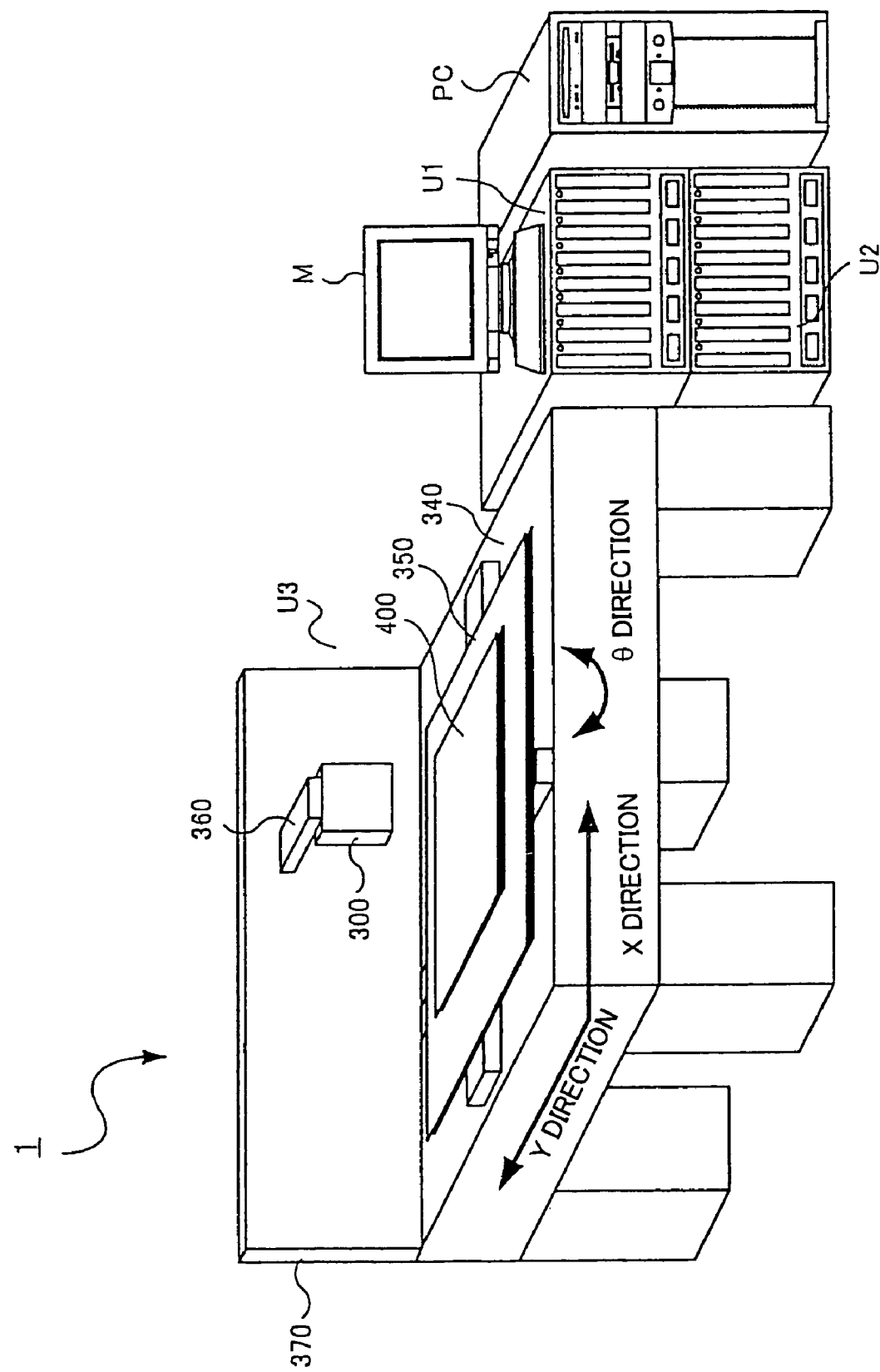
FIG. 1 is a perspective view showing the external appearance configuration of a discharging system of the present invention.

FIG. 1 shows the external appearance configuration of a discharging system 1. The discharging system 1 comprises a personal computer PC, a control unit U1, a driving unit U2, and a producing apparatus u3. The producing apparatus U3 comprises a piezoelectric driving type head unit 300, a reference platform 340, and a stage 350. Among them, the piezoelectric driving type head unit 300 comprises a plurality of piezoelectric driving type heads so that an ink is discharged from each piezoelectric driving type head.

Figure 2:
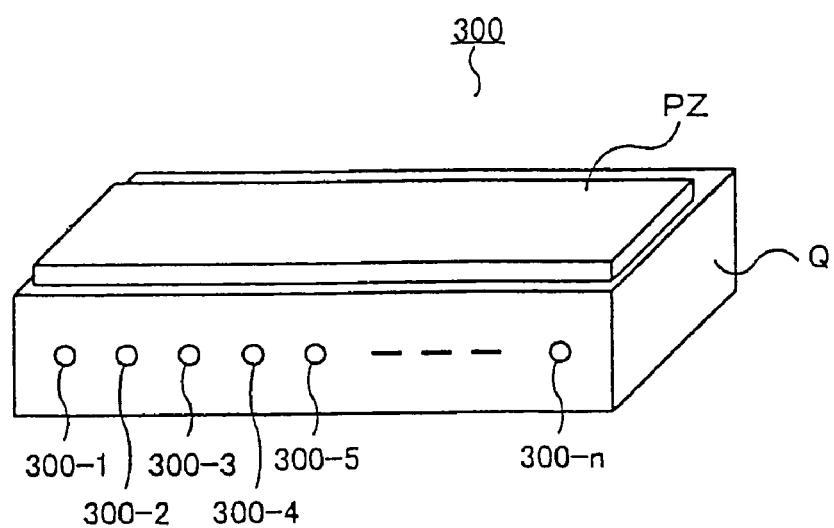
FIG. 2 is a perspective view showing the mechanical configuration of a piezoelectric driving type head unit used in the same system.

FIG. 2 is a perspective view showing the external appearance configuration of the piezoelectric driving type head unit 300. In the description below, the piezoelectric driving type head unit 300 comprises n pieces of piezoelectric driving type heads H1 to Hn. The piezoelectric driving type head unit 300 comprises a main body Q and a piezoelectric element PZ. In the main body Q, orifices 300-1 to 300-$n$ as the ink discharging holes, and walled off ink chambers for each orifice 300-1 to 300-$n$ are formed. Then, an ink is discharged from the each orifice 300-1 to 300-$n$.

Figure 3:
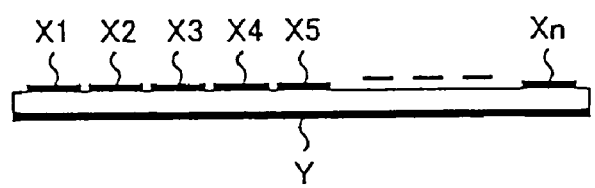
FIG. 3 is a cross-sectional view showing the configuration of a piezoelectric element used in the same unit.

FIG. 3 is a cross-sectional view showing the configuration of the piezoelectric element PZ. As shown in the figure, a common electrode Y is formed on the lower surface of the piezoelectric element PZ to be adhered with the main body Q, and electrodes X1 to Xn are formed on the upper surface thereof.

In the piezoelectric driving type head unit 300, each piezoelectric driving type head H1 to Hn comprises each orifice 300-1 to 300-$n$, each walled off ink chamber for each orifice 300-1 to 300-$n$, and each part corresponding to each electrode X1 to Xn of the piezoelectric element PZ. Although the common piezoelectric element PZ is used for each head piezoelectric driving type head H1 to Hn in this embodiment, of course the piezoelectric element PZ can be divided for each head.

Next, the stage 350 shown in FIG. 1 is movable in the X direction and the Y direction with the reference platform 340 position as the reference by a stage driving mechanism which is not shown in the figure, and furthermore, it is rotatable in the θ direction. Moreover, the stage 350 comprises a vacuuming mechanism, which is not shown in the figure, so that it can vacuum a substrate 400 to be placed thereon. In contrast, the head unit 300 is fixed to a wall 370 via an arm member 360. Furthermore, the wall 370 is fixed perpendicularly to the reference platform 340.

Therefore, by fixing the substrate 400 onto the stage 350 using the vacuuming mechanism and moving the stage 350 by the stage driving mechanism, the relative position of the substrate 400 and the head unit 300 can be adjusted. In the producing apparatus U3, a pattern is formed by discharging an ink from the piezoelectric driving type heads H1 to Hn while moving the substrate 400.

Figure 4:
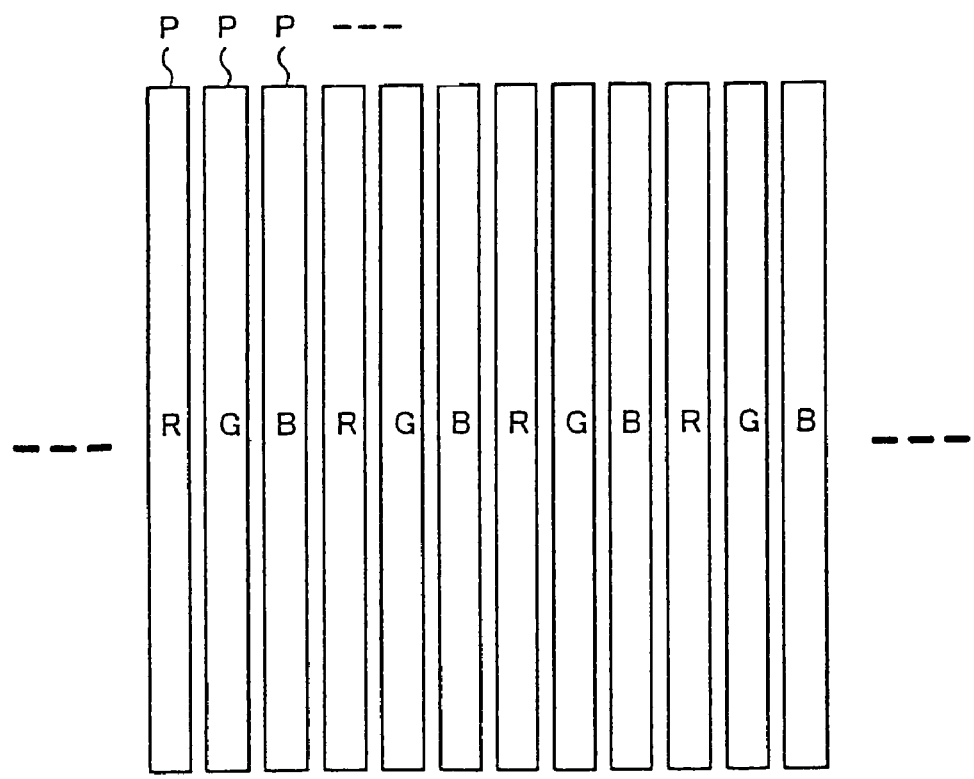
FIG. 4 is a plan view showing the pattern of a color filter formed on a substrate.

FIG. 4 shows a color filter pattern to be formed on the substrate 400. The color filter of this embodiment has stripe-like patterns P, and each mark "R", "G", "B" shown in the figure denotes that the pattern P is colored in the R color, the G color and the B color. Moreover, a light shielding film called the black matrix is formed in between the patterns P.

Figure 5:
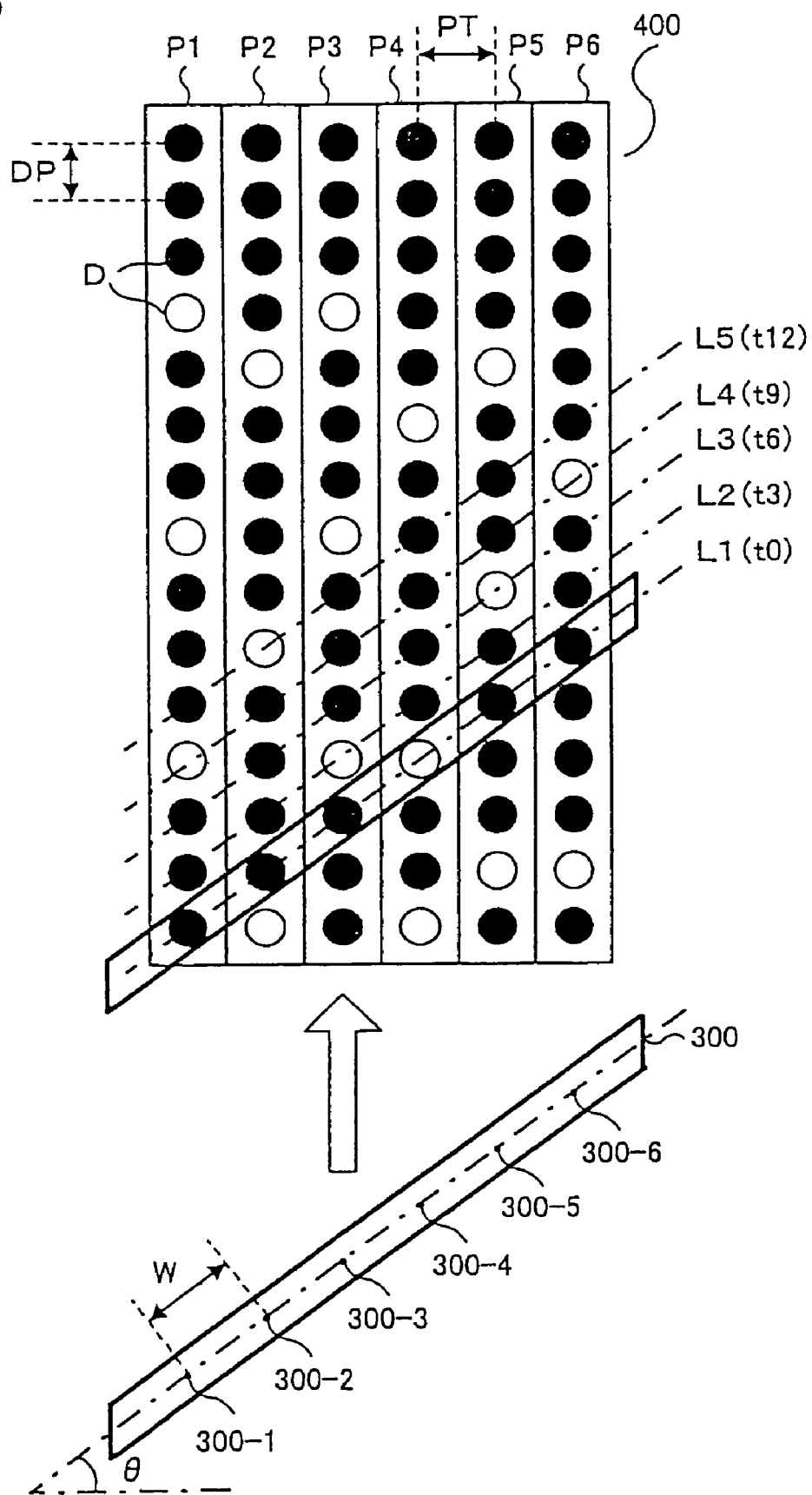
FIG. 5 is an explanatory diagram schematically showing the relationship between the liquid droplet impact position and a piezoelectric driving type head unit 300.

FIG. 5 schematically shows the relationship between the liquid droplet impact position and the piezoelectric driving type head unit 300. The piezoelectric driving type head unit 300 of this embodiment having 6 pieces of the piezoelectric driving type heads H1 to H6, and comprises the orifices 300-1 to 300-6. In this figure, black round dots D show the liquid droplet impact positions, and white round dots D show no execution of the liquid droplet discharge. That is, the liquid droplet discharge is thinned out. In the description below, the distance between the each dot D is referred to as the dot pitch DP, and furthermore, the distance from the center of a pattern to the center of the adjacent pattern is referred to as the pattern pitch PT.

As shown in the same figure, the piezoelectric driving type head unit 300 is located in a certain angle to the longitudinal direction of the pattern P, not perpendicularly. This is because the pattern pitch PT is smaller than the distance W between the each orifice. The angle θ shown in the figure can be obtained from sin−1(W/PT).

Moreover, since the color density of each pattern P1 to P6 is determined by the dot density, in the discharging system 1, the color density is changed by adjusting the dot pitch DP.

Here, with the premise that the liquid droplets are discharged for all the dots D, the liquid droplet amounts to be discharged from each orifice 300-1 to 300-6 should be equal in order to have the even color density between the each pattern P1 to P6. However, in the actual piezoelectric driving type heads H1 to H6 have uneven mechanical and electric characteristics, the liquid droplet amounts discharged from the each orifice 300-1 to 300-6 is not equal. So, in the discharging system 1, by thinning out the liquid droplet discharge, the color density of the each patters P1 to P6 is made even.

For example, in the pattern P1, the liquid droplet discharge is thinned out by a ratio of one time out of four times, and in the pattern P5, the liquid droplet discharge is thinned out by a ratio of two times out of nine times. In the liquid droplet discharge in the pattern P5, a discharging operation of discharging for four times continuously, stopping for one time, discharging for three times continuously and stopping for one time is repeated. That is, the discharging operation is executed such that thinning out can be dispersed as much as possible.

As it will be described later, a lyophilic area is formed as the substrate adjusting process in the substrate 400. Since the lyophilic area has good wettability, the liquid droplets wet and spread in a wide range. Therefore, even when the liquid droplets are not discharged to a dot D by thinning out, the liquid droplets discharged to the adjacent dots D wet and spread, so that the thinned out dot D is coated with the ink as well.

However, the liquid droplet cannot spread unlimitedly in the lyophilic area, and the liquid droplet spreading range has certain limitation. Thinning out is dispersed for coating the ink as even as possible by the liquid droplets impact on the substrate 400 so as to make the color density in the pattern even.

Next, the personal computer PC shown in FIG. 1 produces a bit map data BMD to a predetermined program, and transmits the same to the control unit U1. Moreover, a monitor M is connected to the personal computer PC so that the image showing the discharging system 1 operation state, the image schematically showing the liquid droplet impact position, or the like are displayed thereon.

Here, the bit map data BMD is for determining the impact position of the liquid droplets discharged from the each piezoelectric driving type heads H1 to Hn onto the substrate 400. In other words, "1" is allotted to those of the black circles, and "0" is allotted to those of the white circles for each dot D shown in FIG. 5. According to the bit map data BMD, whether or not the liquid droplets are to be discharged to each dot can be determined.

Next, the control unit U1 functions as the control center of the discharging system 1 so that it controls the driving unit U2 and the producing apparatus U3 based on the bit map data BMD transmitted form the personal computer PC. Moreover, the driving unit U3 produces a high voltage driving pulse, synchronously with a trigger signal sent out from the control unit U1, and supplies the same to the piezoelectric driving type head unit 300.

2. Production of the Bit Map Data

Figure 10:
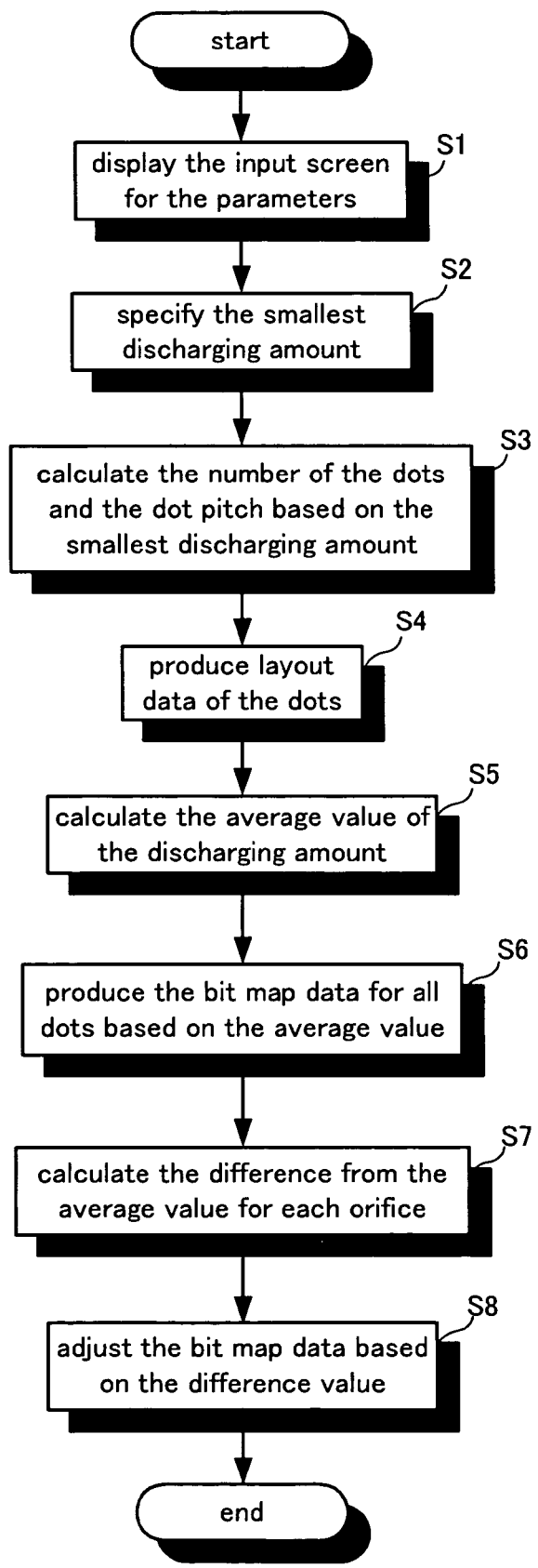
FIG. 10 is a flow chart showing the operation of a personal computer PC concerning production of a bit map data BMD according to the first embodiment.

Next, production of the bit map data BMD will be explained. For the production of the bit map data BMD, there are two embodiments described below. FIG. 10 is a flow chart showing the operation of the personal computer PC according to the first embodiment.

The personal computer PC displays an input screen for inputting the parameters necessary for producing the bit map data BMD on the monitor M, inducing the operator to input each parameter (step S1).

Figure 11:
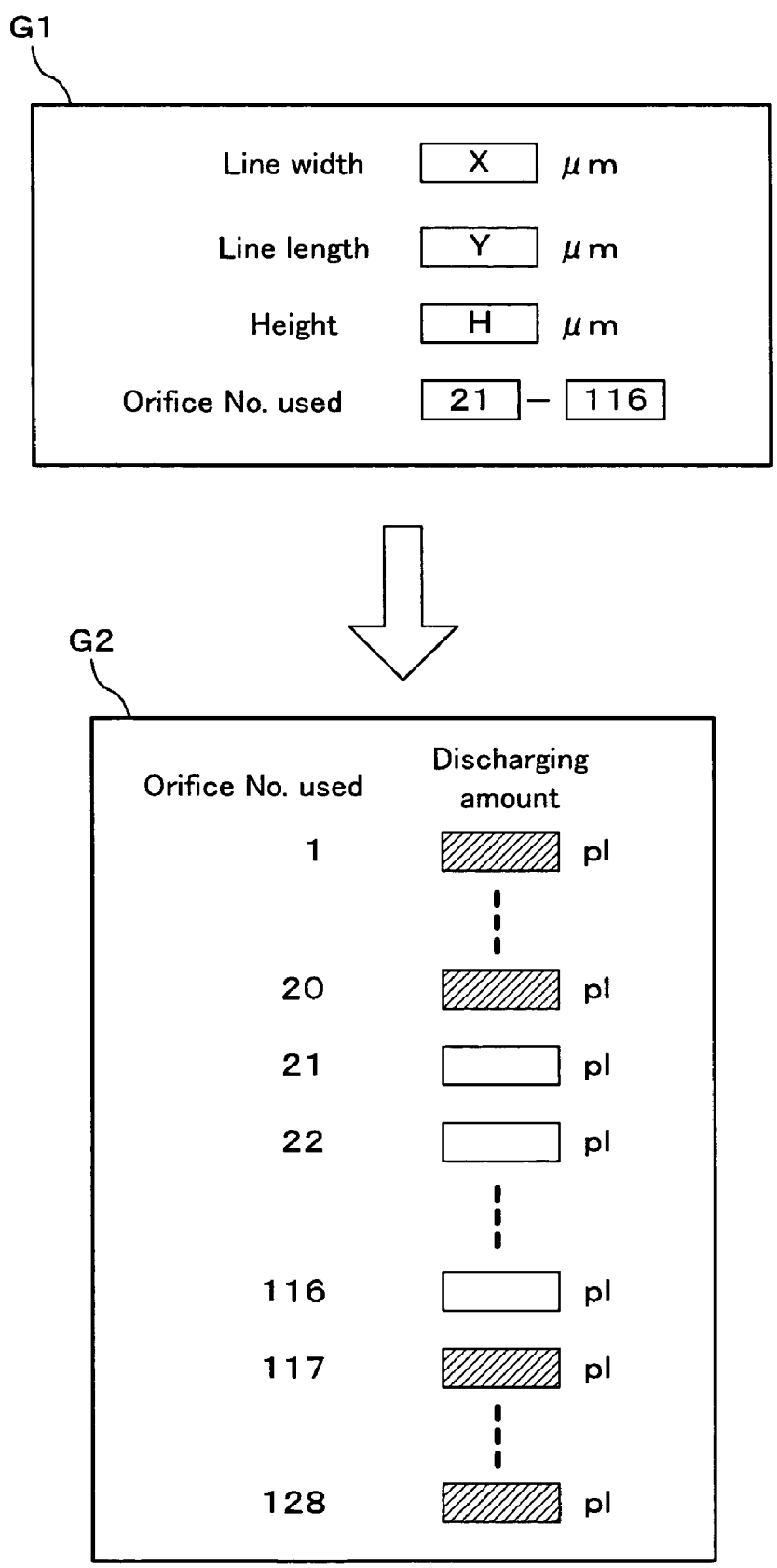
FIG. 11 is an explanatory diagram for explaining the parameter input screen.

FIG. 11 shows an example of the input screen. On the monitor M, a first input screen G1 is displayed. Here, the line width denotes the pattern P width, and the line length denotes the pattern length. Furthermore, the height denotes the pattern P film thickness. According to these parameters, the volume of a pattern P can be calculated. In this embodiment, the operator inputs X as the line width, Y as the line length, and H as the height.

Additionally, the orifice No. used denotes the numbers of the orifices to discharge the liquid droplets out of the each orifice 300-1 to 300-n of a head unit 300. In this embodiment, n=128, and the $21^{st}$ orifice 300-21 to the $116^{th}$ orifice 300-116 are to be used.

When the operator completes the input of the each parameter of the input screen G1, the personal computer PC displays an input screen G2 on the monitor M, inducing the operator to input the discharging amount per one time of discharge for the orifices to be used. The operator preliminarily measures the discharging amount (volume) from the each orifice 300-1 to 300-n. As to the discharging amount, an ink is discharged actually from the each orifice 300-1 to 300-n, and the value of the weight observation is converted from the specific gravity of the ink. When the operator inputs the discharging amount, the personal computer PC memorizes each orifice number and the discharging amount corresponding with each other.

When the input of the parameter is finished, the personal computer PC forwards the process to the step S2 shown in FIG. 10 for specifying the smallest discharging amount. Next, the personal computer PC calculates the number of dots in the pattern and the dot pitch DP based on the smallest discharging amount (step S3). The number of dots is calculated by dividing the pattern volume by the smallest discharging amount. Specifically, with the premise that the number of dots is SD and the smallest discharging amount is Kmin, the personal computer PC calculates the number of dots DS by the following formula: $SD=(X \cdot Y \cdot H)/Kmin$.

Moreover, the personal computer PC calculates the dot pitch DP by the following formula: $DP=Y/SD=Kmin/(X \cdot H)$.

Next, the personal computer PC produces the layout data of the dots D (step S4). The layout data for showing the arrangement of each dot D are produced based on the orifice numbers to be used and the number of dots. At this point, only the dot D arrangement is determined, and thus which dots D are to be valid or invalid is not determined yet.

Next, the personal computer PC calculates the average value of the discharging amount from the each orifice 300-1 to 300-n (step S5). Furthermore, it produces the bit map data BMD for all the dots based on the average value. Here, with the premise that the average value is Kavr, the bit map data BMD with the dots thinned out by a 1−Kmin/Kavr ratio are produced. For example, in the case the average value Kavr is 10pl, and the smallest discharging amount Kmin is 9pl, the 1−Kmin/Kavr value is 0.9 so that one dot D is thinned out (invalid) with respect to 10 dot Ds, and 9 dots Ds are valid.

Next, the personal computer PC calculates the difference from the average value for each orifice 300-1 to 300-n (step S7). Here, each difference value is shown by % based on the average value. For example, if the discharging amount of an orifice is 10.5 pl, the difference value Δ corresponding to the orifice is calculated by the following formula: $\Delta=100 \cdot (10.5-Kavr)/Kavr=+5\%$.

Next, the personal computer PC adjusts the bit map data BMD based on the difference value for each orifice 300-1 to 300-n (step S8). For example, in the case the difference value Δ is −10%, the bit map data BMD are adjusted such that one dot D is valid with respect to 10 dot Ds, and in the case the difference value Δ is +5%, the bit map data BMD are adjusted such that one dot D is invalid with respect to 20 dot Ds.

Thereby, even when the ink discharging amounts discharged form the each orifice 300-1 to 300-n differ, the unevenness between the piezoelectric driving type heads H1 to Hn can be adjusted by making the liquid droplet impact amount per unit area on the substrate 400 even. In other words, the personal computer PC produces the bit map data BMD such that the liquid droplet impact amount per unit area on the substrate 400 is made even based on the parameters.

Figure 12:
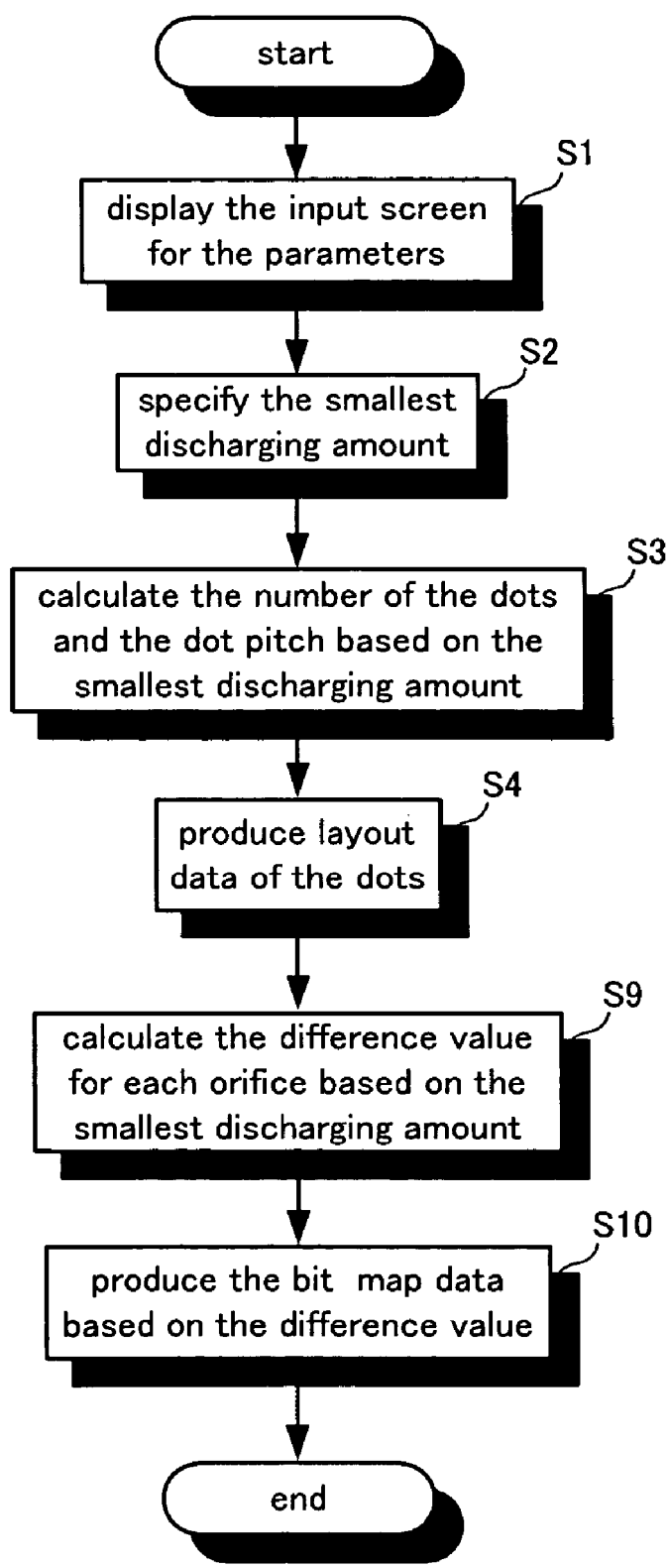
FIG. 12 is a flow chart showing the operation of a personal computer PC concerning production of a bit map data BMD according to the second embodiment.

Next, FIG. 12 shows a flow chart showing the operation of the personal computer PC according to a second embodiment. Since the process in the steps S1 to S4 is same as that in the first embodiment, explanation is omitted.

When the step S4 is finished, the personal computer PC calculates the difference value Δ for the discharging amounts form the each orifice 300-1 to 300-n based on the smallest discharging amount Kmin (step S9).

Here, the difference value Δ is represented by % based on the smallest discharging amount Kmin. For example, when the discharging amount of an orifice is 11 pl and the smallest discharging amount Kmin is 10 pl, the difference value Δ corresponding to the orifice is calculated by the following formula: Δ=100·(11−Kmin)/Kmin=+10%.

Next, the personal computer PC produces the bit map data BMD based on the difference value for each orifice 300-1 to 300-n (step S10). For example, when the difference value Δ is +10%, the bit map data BMD are produced such that one dot D is invalid with respect to 10 dots D.

Thereby, even when the ink discharging amounts discharged form the each orifice 300-1 to 300-n differ, the unevenness between the each piezoelectric driving type head H1 to Hn can be corrected by making the liquid droplet impact amount per unit area on the substrate 400 even. In other words, the personal computer PC produces the bit map data BMD such that the liquid droplet impact amount per unit area on the substrate 400 is made even based on the parameters.

In the above mentioned first and second embodiments, the personal computer PC produces the bit map data BMD such that the dots D corresponding to thinning out are dispersed substantially even in the pattern. For example, in the case of thinning out the discharge corresponding to 5 dot Ds out of 100 dot Ds, the personal computer PC produces the bit map data BMD for commanding the discharging for continuous 19 dot Ds, and commanding the discharging stoppage for the subsequent one dot D.

Moreover, in the above mentioned first and second embodiments, a manual bit map data BMD adjusting process may be added. In the adjusting process, the bit map showing valid or invalid for each dot D is displayed on the monitor M so that the operator can designate the dot Ds desired to be changed by using an inputting device such as a mouse to input the change command. In this case, the personal computer PC can invert valid and invalid for the dots D designated for the change. For example, in the case a dot D is designated, if the bit map data BMD value corresponding to the dot D is "1", the value can be changed to "0", and if the value is "0", the value can be changed to "1".

Furthermore, in the above mentioned first and second embodiments, a measuring device for automatically measuring the discharging amount of each orifice 300-1 to 300-n may be added to the producing apparatus U3 so that the personal computer PC takes in the measurement result form the measuring device. In this case, an electronic force balance and a test substrate are used. First, the weight of the test substrate is measured by the electronic force balance so that the measurement result is taken into the personal computer PC. Second, the test substrate is placed onto the stage 350 by an automatic conveying device. Third, an ink is discharged for a plurality of times from an orifice. Fourth, the test substrate is conveyed again to the electronic force balance for measuring its weight so that the measurement result is taken into the personal computer PC. Fourth, the weight difference between before and after the discharging is calculated by the personal computer PC, and the calculation result is divided by the number of the discharges for calculating the one time discharging weight. Fifth, the personal computer PC converts the discharging weight by the ink specific gravity for calculating the discharging amount. The discharging amount of the each orifice 300-1 to 300-n may be taken into the personal computer PC automatically by executing the process for each orifice 300-1 to 300-n.

3. Electronic Configuration of the Discharging System

Figure 6:
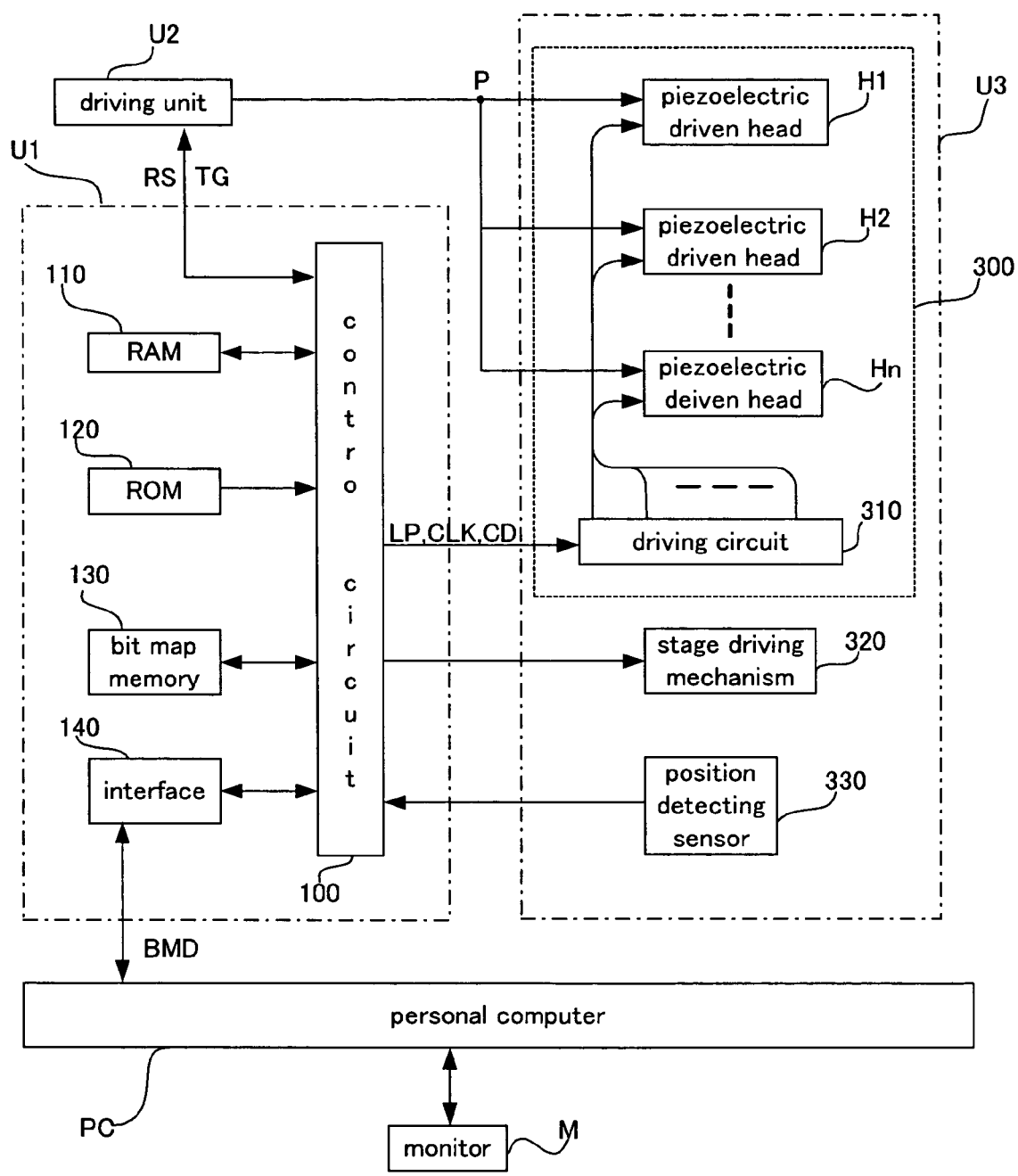
FIG. 6 is a block diagram showing the electric configuration of the same system.

Next, the electronic configuration of the discharging system 1 will be explained. FIG. 6 is a block diagram showing the electronic configuration of the discharging system 1.

The control unit U1 comprises a control circuit 100, a RAM 110, a ROM 120, a bit map memory 130 and an interface 140. The control circuit 100 has a CPU as the principal part, which is connected to each constituent parts of the control unit 100 via a bus (not shown in the figure). The RAM 110 functions as the work area for the control circuit 100 for storing the data during the calculation, or the like. Moreover, in the ROM 120, in addition to the boot programs, the control program for controlling the entire control unit U1 is stored. The control circuit 100 controls the discharging system 1 according to this control program. Furthermore, the bit map memory 130 stores the bit map data BMD transmitted form the personal computer PC. The interface 140 is for the communication with respect to the personal computer PC, and the communication protocol is based on, for example, the SCSI standard.

Moreover, the control circuit 100 controls a stage driving mechanism 320 for moving the stage 350 and the substrate 400 shown in FIG. 1. In order to move the stage 350, the position thereof should be detected accurately. A position detecting sensor 330 provided in the producing apparatus U3 is a configuration for detecting the position of the stage 350, produces a position signal showing the position of the stage 350, and supplies the position signal to the control circuit 100 of the control unit U1. The control circuit 100 moves the stage 350 and the substrate 400 based on the position signal.

Moreover, the control circuit 100 produces a trigger signal TG, which becomes active at a low level according to the control program. The driving unit U2 detects transition of the theoretical level of the trigger signal TG from a high level to a low level, produces a driving pulse V, and supplies the same to each piezoelectric driving type head H1 to Hn constituting the piezoelectric driving type head unit U3. Therefore, the driving pulse V will be synchronized with the trigger signal TG. Moreover, the driving unit U2 produces a response signal RS showing the activating period of the driving pulse V and supplies the same to the control circuit 100.

Figure 7:
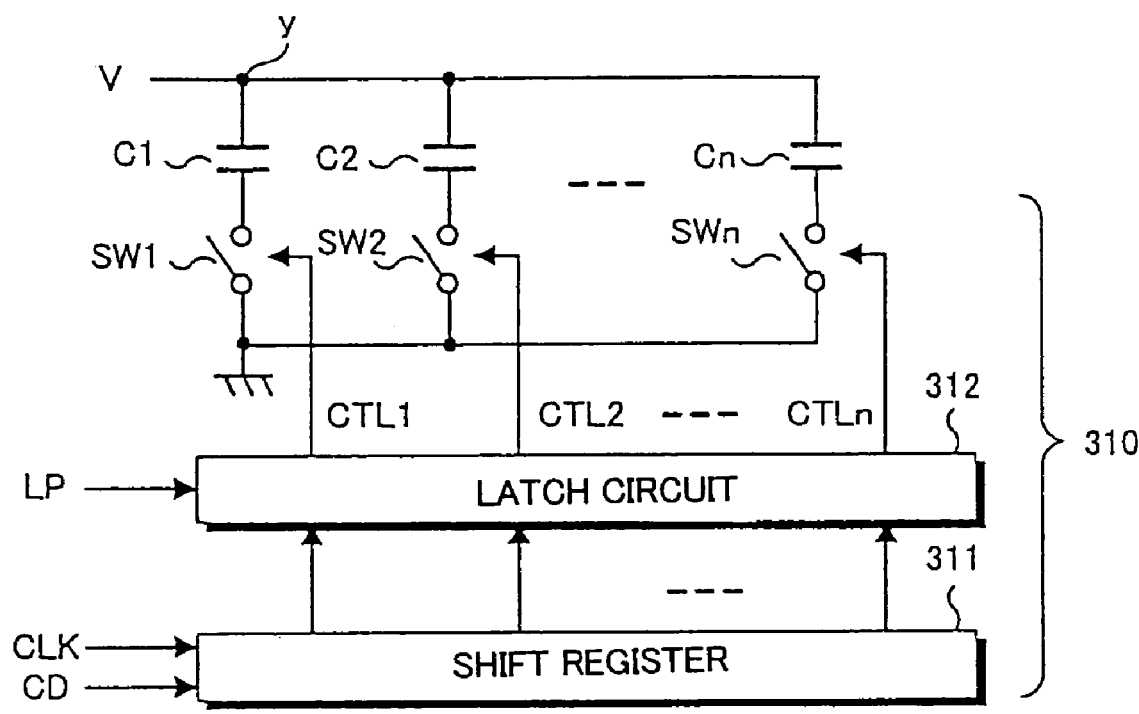
FIG. 7 is a circuit diagram of a driver circuit used in the same system.

Next, the piezoelectric driving type head unit U3 comprises a driver circuit 310. FIG. 7 is a circuit diagram showing the configuration of the driving circuit 310 and the peripheral circuit thereof. In this figure, capacitors C1, C2, ..., Cn are shown by the piezoelectric element PZ, comprising each piezoelectric driving type head H1 to Hn, as the equivalent circuit. Each terminal to be connected with the connection point y out of each terminal of the capacitors C1, C2, ..., Cn corresponds to the common electrode Y shown in FIG. 3, and each terminal on the side opposite to the connection point y corresponds to the electrodes X1, X2, ..., Xn shown in FIG. 3.

The driver circuit 310 comprises a shift register 311, a latch circuit 312, and switches SW1, SW2, ..., SWn. The shift register 311 takes in the control data CD synchronized with a clock signal CLK. The control data CD are serial type data for designating whether each piezoelectric driving type head H1 to Hn is to be valid or invalid. The control data CD are produced by the control circuit 100 based on the bit map data BMD. The latch circuit 312 latches each output signal of the shift register 311 based on a latch pulse LP. Then, on or off of each switch SW1, SW2, ..., SWn is controlled based on the output signal CTL1, CTL2, ..., CTLn of the latch circuit 312.

4. Discharging System Operation

Figure 8:
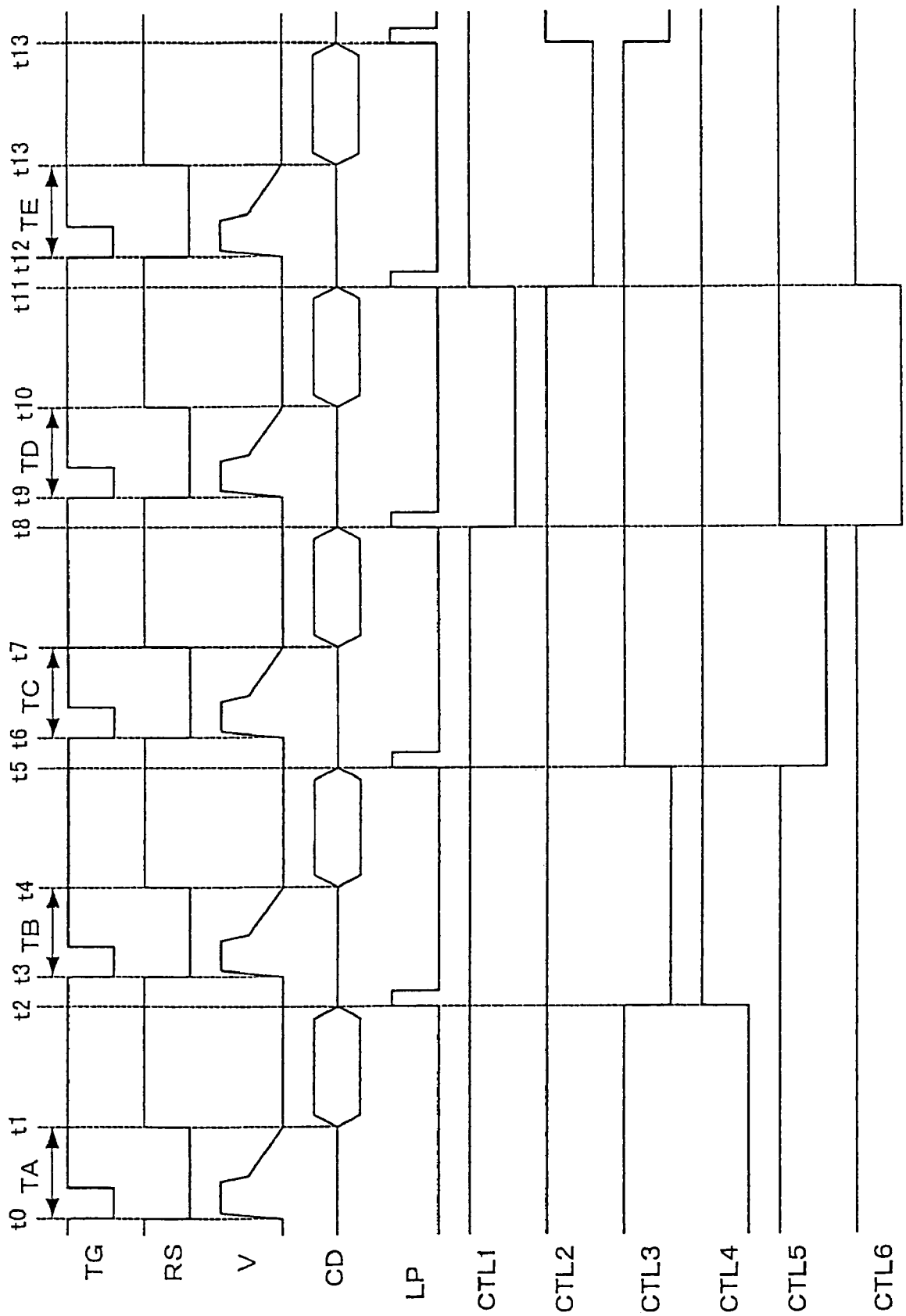
FIG. 8 is a timing chart showing the operation of the same system.

Next, the operation of the discharging system 1 will be explained. FIG. 8 is a timing chart showing an operation example of the discharging system 1. In this example, the patterns P1 to P6 shown in FIG. 5 are to be formed, and the relative position of the piezoelectric driving type head unit 300 and the substrate 400 is as shown in FIG. 5.

When the piezoelectric driving type head unit 300 reaches at the line L1 at the time t0, the control circuit 100 activates the trigger signal TG (low level).

The driving unit U2 which has received the trigger signal TG activates the driving pulse V in the period TA, and also activates the response signal RS (low level). Thereby, the driving pulse V is supplied to each piezoelectric driving type head H1 to H6. Since the output signals CTL1 to CTL6 of the latch circuit 312 are "H, H, H, L, H" in the period TA, the switches SW1 to SW3, SW5 and SW6 become to the on state, and on the other hand, the switch SW4 becomes to the off state. Therefore, the liquid droplets are discharged from the orifices 300-1 to 300-3, 300-5 and 300-6, and the liquid droplets are not discharged form the orifice 300-4. That is, the liquid droplet discharge is thinned out for the dot D corresponding to the pattern P4 on the line L1.

Next, when the driving pulse V becomes inactive at the time t1, the driving unit U2 inactivates the response signal RS (high level). When the control circuit 100 detects the response signal RS in the inactive state, it sends out the control data CD for the next discharge to the driver circuit 310. Then, when the control circuit 100 activates the latch pulse LP (time t2) after finishing the sending out operation of the control data CD, the latch circuit 312 latches each output signal of the shift register 311. Thereby, the theoretical level of the output signals CTL1 to CTL6 is switched.

In this example, the theoretical level of the output signal CTL3 is changed from the high level to the low level, and the theoretical level of the output signal CTL4 is changed from the low level to the high level.

Then, when the piezoelectric driving type head unit 300 reaches at the line L2 at the time t3, the control circuit 100 activates the trigger signal TG (low level). Then, also in the period TB as in the period TA, the driving pulse V is supplied to each piezoelectric driving type head H1 to H6. However, since the output signals CTL1 to CTL6 are "H, H, L, H, H" in the period TB, the switches SW1, SW2, and SW4 to SW6 are in the on state, and the switch SW3 is in the off state. Therefore, the liquid droplets are discharged from the orifices 300-1, 300-2, and 300-4 to 300-6, and the liquid droplets are not discharged form the orifice 300-3.

That is, the liquid droplet discharge is thinned out for the dot D corresponding to the pattern P4 on the line L2.

Hereafter, same as the above, by executing the liquid droplet discharge with a predetermined dot D thinned out in the periods TC, TD, TE, ..., the liquid droplet amount per unit area to be impact on the substrate 400 of the ink discharged form each piezoelectric driving type head H1 to Hn can be evened. Thereby, a pattern with even thickness can be formed so that a color filter with an even color density can be produced.

5. Method for Manufacturing Pattern Forming Body

Next, the method for manufacturing a pattern forming body of the present invention will be explained. The method for manufacturing a pattern forming body of the present invention is, for forming a pattern on a substrate by discharging a plurality of liquid droplets to the substrate from each head while changing the relative position of a head unit with a plurality of integrated heads and the substrate, wherein a pattern of a lyophilic area, where the liquid droplets wet and spread, corresponding to a pattern to be formed is formed on the substrate surface, and the discharging of the liquid droplets of the each head is thinned out according to a predetermined rule such that the liquid droplet amount per unit area to be impacted on the lyophilic area is made even.

In the present invention, since the liquid droplets to be discharged from each head are thinned out according to a predetermined rule, it is advantageous in that the liquid droplet amount per unit area on the lyophilic area can be made even by onetime of coating process. Moreover, in the present invention, since the liquid droplet impact position is a lyophilic area, even when the liquid droplets are thinned out, the liquid droplets can wet and spread so that even film thickness can be provided. The lyophilic area here is not particularly limited as long as it has wettability to an extent that the impacted coating solution can wet and spread, and in particular, it is preferable to use a lyophilic area to have the contact angle with the subject coating solution of 20° or less, preferably 10° or less.

Moreover, as the pattern of the pattern forming body to be formed in the present invention, a stripe-like pattern is preferable, and it is preferable in the case of forming a stripe by the liquid droplets from one head because the liquid droplet amount irregularity between the heads becomes a problem particularly in the case of forming such a pattern.

In the present invention, it is preferable that the liquid droplet discharge information from the heads is determined such that the liquid droplet discharge thinning out positions are dispersed substantially equally in the lyophilic area because even film thickness may not be formed even when the impact liquid droplets wet and spread if the discharging thinning out positions, that is, the positions without the discharge are provided continuously.

In the present invention, to what extent of the interval thinning out can be executed continuously is determined by preliminarily measuring the wettability of the coating solution to the lyophilic area on the substrate, and making it within the same range. Moreover, it is also possible to determine the lyophilic area wettability so as to have the liquid droplets in even film thickness in the lyophilic area at the time the liquid droplets are thinned out so as to even the head irregularity in an ink jet apparatus in a range ordinarily tolerated.

Moreover, in the present invention, it is preferable that the discharging information is determined such that the liquid droplet discharge is thinned out at the end part of the lyophilic area. For example, in the case of forming a stripe-like pattern, it is preferable not to discharge the liquid droplets in the end parts of the lyophilic area corresponding to the end parts of the stripe, that is, in the area for starting the coating operation and the area for finishing the coating operation.

In general, when the liquid droplets are coated using an ink jet apparatus, the end parts tends to have thicker film thickness. In the present invention, the thickening of the end parts can be made even by thinning out the liquid droplets discharge at the end parts. At the time, since to what extent of the distance from the end parts the liquid droplet discharge is to be thinned out differs drastically depending on the wettability of the lyophilic area of each substrate and the coating solution to be coated, the viscosity of the coating solution, or the like, in general it is preferable to determine the distance by preliminarily executing a coating operation.

In the present invention, it is preferable that the pattern of the lyophilic area to be formed on the substrate surface is formed by using the wettability variable layer capable of changing the wettability by the function of a photocatalyst accompanied by energy pattern irradiation, and by irradiating energy onto the wettability variable layer in a pattern-like form.

Since the method for forming the lyophilic area pattern utilizing the function of the photocatalyst can form the lyophilic area by the energy pattern irradiation, a high definition lyophilic area pattern can be formed so that a high definition pattern forming body such as a color filter can be dealt with.

In the present invention, as the method for forming the lyophilic area pattern using the photocatalyst, there are an embodiment of using the wettability changeable layer as a wettability variable layer which the wettability is changed by the energy irradiation after contacting with a photocatalyst processing layer containing a photocatalyst, or locating with a gap of 200 µm or less therebetween (hereinafter, it is referred to as the first embodiment), and an embodiment of using a photocatalyst containing layer as the wettability variable layer which comprises a photocatalyst and a binder, and the wettability is changed so as to lower the contact angle with a liquid by the function of the photocatalyst accompanied by the energy irradiation (hereinafter, it is referred to as the second embodiment). Hereinafter, each will be explained.

(1) First Embodiment

First, an embodiment of using the wettability changeable layer will be explained. The wettability changeable layer used in this embodiment has a wettability pattern of a lyophilic area and a liquid repellent area formed on its surface by exposure (Here, the exposure in the present invention is the concept including the energy irradiation. Moreover, the energy of the energy irradiation denotes energy capable of changing the wettability of the wettability changeable layer or the photocatalyst containing layer such as an ultraviolet ray) in a state contacted with the photocatalyst processing layer containing a photocatalyst.

The wettability changeable layer is a wettability changeable layer which the wettability is changed so as to lower the contact angle of the liquid by the function of the photocatalyst accompanied by the energy irradiation. Thereby, the wettability can easily be changed by executing the pattern exposure, or the like so that a pattern of a lyophilic area having a small contact angle with a liquid can be formed. Therefore, by exposing only the part those are to be the lyophilic area on the wettability changeable layer, that is, the area for forming the coloring layer in the case of a color filter, a lyophilic area can be provided easily. By adhering a coloring layer forming coating solution in this part, for example, in the case of the color filter, a color filter having a coloring layer can be formed easily. Therefore, a color filter can be manufactured efficiently so that it is advantageous in terms of the cost.

Here, the lyophilic area is an area having a small contact angle with a predetermined liquid as mentioned above, and thus it refers to an area having good wettability with respect to a pattern forming coating solution such as the coloring layer forming coating solution for a color filter, or the like. Moreover, the liquid repellent area is an area having a large contact angle with a liquid, and thus it refers to an area having poor wettability with respect to a pattern forming coating solution such as the coloring layer forming coating solution for a color filter, or the like.

The wettability of the liquid repellent area and the lyophilic area to be formed on the wettability changeable layer surface used in this embodiment are preferably in the following ranges. That is, in the liquid repellent area, the contact angle with a liquid having 40 mN/m surface tension is preferably 10° or more, the contact angle with a liquid having 30 mN/m surface tension is preferably 10° or more, and in particular the contact angle with a liquid having 20 mN/m surface tension is 10° or more. This is because the water repellent area, that is, the part which is not exposed is the part required to have the liquid repellency in this embodiment so that if the contact angle with a liquid is small, the liquid repellency is not sufficient so that the coating solution, or the like may remain, and thus it is not preferable.

Moreover, in the lyophilic area of the wettability changeable layer surface, the contact angle with a liquid having 40 mN/m surface tension is preferably 9° or less, the contact angle with a liquid having 50 mN/m surface tension is preferably 10° or less, and in particular the contact angle with a liquid having 60 mN/m surface tension is 10° or less. This is because spreading of the coating solution, or the like in this part may be poor if the contact angle with a liquid is high in the lyophilic area.

The contact angle in this embodiment was obtained from the results or a graph of the results by the measurement (30 seconds after dropping liquid droplets from a micro syringe) of the contact angle with liquids having various surface tensions using a contact angle measuring device (CA-Z type manufactured by Kyowa Interface Science Co., LTD.). Moreover, at the time of the measurement, as the liquids having the various surface tensions, wetting index standard solutions manufactured by JUNSEI CHEMICAL CO., LTD. were used.

As mentioned above, the wettability changeable layer used in this embodiment is not particularly limited as long as it is made of a material which the surface wettability is changeable by the function of the photocatalyst. For example, it may be coated on a substrate, and one having the self supporting property itself such as a film-like one can be used as well.

Having the self supporting property, in this embodiment denotes capable of existing in a tangible state without other supporting material.

As the material for the wettability changeable layer used in this embodiment, specifically, a material which the contact angle, with a liquid having surface tension equivalent to the surface tension of the pattern forming coating solution to be coated thereafter, is changed by at least 1° or more, preferably 5°, in particular 10° or more by having the photocatalyst containing layer contacted with its surface and irradiating the energy can be presented.

As such a material, for example, a polyethylene, a polycarbonate, a polypropylene, a polystyrene, a polyester, a polyvinyl fluoride, an acetal resin, a nylon, an ABS, a PTFE, a methacrylic resin, a phenol resin, a polyvinylidene fluoride, a polyoxy methylene, a polyvinyl alcohol, a polyvinyl chloride, a polyethylene terephthalate, a silicone, or the like can be presented.

In contrast, as to the material to be coated on the substrate to form the wettability changeable layer, it is not particularly limited as long as it is a material having characteristics of the above mentioned wettability changeable layer, that is, which the wettability is changed by the function of the photocatalyst in the photocatalyst processing layer to be contacted or located in the vicinity, by the exposure, and having a principal chain which is hardly deteriorated or decomposed by the function of the photocatalyst.

Specifically, (1) an organo polysiloxane which provides high strength by hydrolyzing or polycondensating a chloro or alkoxy silane, or the like by the sol gel reaction, or the like, (2) an organo polysiloxane obtained by cross-linking a reactive silicone having the excellent water repellent property or oil repellent property, or the like can be presented.

In the case (1), it is preferably an organo polysiloxane as a hydrolyzed condensation product or a co-hydrolyzed condensation product of one kind or two or more kinds of silicon compounds represented by the general formula:

$Y_n SiX_{(4-n)}$.

(Here, Y is an alkyl group, a fluoro alkyl group, a vinyl group, an amino group, a phenyl group or an epoxy group, and X is an alkoxyl group, an acetyl group or a halogen. N is an integer from 0 to 3.). Here, the number of carbon atoms of the group represented by Y is preferably in a range of 1 to 20. Moreover, the alkoxy group represented by X is preferably a methoxy group, an ethoxy group, a propoxy group, or a butoxy group. Moreover, in particular, a polysiloxane containing a fluoro alkyl group can be used preferably. Those known in general as a fluorine based silane coupling agent can be used.

The specific materials, or the like, are disclosed in detail in the official gazette of the Japanese Patent Application Laid Open (JP-A) No. 2000-249821 applied by the present inventor, or the like.

Moreover, as the reactive silicone (2), compounds having a skeleton represented by the following general formula can be presented.

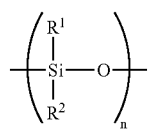

Here, n is an integer of 2 or more, $R^1$, $R^2$ each are a substituted or non substituted alkyl, alkenyl, aryl or cyano alkyl group having 1 to 10 carbon atoms, and 40% or less of the entirety based on the molar ratio is a vinyl, a phenyl, or a halogenated phenyl. Moreover, those having $R^1$, $R^2$ as a methyl group are preferable since the surface energy becomes the smallest, and it is preferable that a methyl group accounts for 60% or more based on the molar ratio.

Moreover, at least one or more reactive group such as a hydroxyl group is provided in a molecular chain at the chain end or the side chain.

Moreover, together with the organo polysiloxane, a stable organo silicon compound which does not to have the cross-linking reaction such as a dimethyl polysiloxane can be mixed therewith.

Such a wettability changeable layer can be formed by preparing a coating solution by dispersing the above mentioned components in a solvent, with other additives as needed, and coating the coating solution onto the substrate. In this embodiment, the thickness of the wettability changeable layer is preferably in a range of 0.001 μm to 1 μm in terms of the relationship of the wettability change speed by the photocatalyst, or the like, and it is particularly preferably in a range of 0.01 to 0.1 μm.

In this embodiment, by using the wettability changeable layer of the above mentioned components, according to the function of the photocatalyst in the photocatalyst processing layer contacted with or located with a predetermined interval, the wettability of the exposed part can be changed so as to be lyophilic using the function of the oxidation, decomposition, or the like of the organic group or the additive as apart of the above mentioned components so that a large difference can be generated in the wettability with respect to the non exposed part. Therefore, by improving the acceptability (lyophilic property) and the repellency (liquid repellent property) to a functional part composition such as the coloring layer forming coating solution, or the like, a color filter of a good quality and advantageous in terms of the cost, or the like can be provided.

The method for forming a wettability pattern comprising the lyophilic area and the liquid repellent area on the wettability changeable layer is by the pattern exposure being in contact with the photocatalyst processing layer as mentioned above.

As the photocatalyst processing layer, the photocatalyst containing layer to be described later can be used preferably, but this embodiment is not limited thereto, and for example it may be a layer formed only with a photocatalyst by the vacuum film formation method, or the like. As to the kind of the photocatalyst to be used, those used in the second embodiment to be described later can be used as well.

Moreover, in this contact embodiment, it may be contacted actually, or exposure can be carried out in a state with a gap of 200 μm or less, particularly in a range of 0.2 μm to 10 μm, specially in a range of 1 μm to 5 μm formed between the wettability changeable layer and photocatalyst processing layer.

(2) Second Embodiment

This embodiment is an embodiment of the wettability variable layer is a photocatalyst containing layer comprising a photocatalyst and a binder.

Since the definition of the lyophilic area and the liquid repellent area on the photocatalyst containing layer, the wettability range, or the like are same as the explanation in the first embodiment, explanation here is omitted.

The above-mentioned photocatalyst containing layer used in this embodiment comprises at least a photocatalyst and a binder. By making the layer as above, the critical surface tension can be made higher by the change of the components in the binder by the photocatalyst function by the energy irradiation so that the wettability pattern can be formed easily as a result.

Although the function mechanism of the photocatalyst represented by a titanium oxide to be described later in the photocatalyst containing layer is not always clear, it is considered that a carrier produced by the light irradiation provides the change in the chemical structure of an organic substance by the direct reaction with a compound in the vicinity or by the active oxygen species generated in the presence of an oxygen and water.

When the photocatalyst containing layer is used as the wettability variable layer in this embodiment, by the photocatalyst, using the function of oxidation, decomposition, or the like of the organic group or the additive as a part of the binder, the wettability of the energy irradiated part is changes so as to be lyophilic so that a large difference can be generated with respect to the wettability the unirradiated part.

Moreover, when such a photocatalyst containing layer is used in this embodiment, the photocatalyst containing layer may be formed such that the photocatalyst containing layer contains at least a photocatalyst and a fluorine, and furthermore, the fluorine content of the photocatalyst containing layer surface is lowered by the function of the photocatalyst at the time of the energy irradiation to the photocatalyst containing layer with respect to the state before the energy irradiation.

The fluorine content in the lyophilic area, having a low fluorine content formed by the energy irradiation, is 10 or less with respect to the fluorine content in the area without the energy irradiation as 100, more preferably 5 or less, particularly preferably 1 or less.

The measurement of the fluorine content in the photocatalyst containing layer can be carried out using various commonly executed methods, and it is not particularly limited as long as it is a method capable of measuring the fluorine amount quantitatively on the surface such as the X-ray photoelectron spectroscopy, ESCA (it is referred to also as the electron Spectroscopy for chemical Analysis), the fluorescent X ray analysis method, the mass spectrometry method, or the like.

As the photocatalyst used in this embodiment, those known as photo semiconductors, such as a titanium oxide ($TiO_2$), a zinc oxide (ZnO), a tin oxide ($SnO_2$), a strontium titanate ($SrTiO_3$), tungsten oxide ($WO_3$), bismuth oxide ($Bi_2O_3$), and an iron oxide ($Fe_2O_3$) can be presented, and one kind or two or more kinds as a mixture can be selected and used from them.

In this embodiment, in particular, a titanium oxide can be used preferably since it has high band gap energy, it is chemically stable without the toxicity, and it can be obtained easily. There are an anatase type and a rutile type in the titanium oxides, and either can be used in this embodiment, and the anatase type titanium oxide is preferable. The anatase type titanium oxide has a 380 nm or less excitation wavelength.

As the anatase type titanium oxide, for example, a hydrochloric acid peptization type anatase type titania sol (STS-02 (average particle size 7 nm) manufactured by Ishihara Sangyo Kaisha, Ltd., or ST-K01 manufactured by Ishihara Sangyo Kaisha, Ltd.), anitric acid peptization type anatase type titania sol (TA-15 (average particle size 12 nm) manufactured by Nissan Chemical Industries, Ltd.), or the like can be presented.

Smaller the particle size of the photocatalyst is, the photocatalyst reaction is generated more effectively, and thus it is preferable. An average particle size of 50 nm or less is preferable, and use of a photocatalyst of 20 nm or less is particularly preferable. Moreover, smaller particle size of the photocatalyst is, the surface roughness of the formed photocatalyst containing layer becomes smaller, and thus it is preferable. When the photocatalyst particle size exceeds 100 nm, the center line average surface roughness of the photocatalyst containing layer becomes coarse so that the liquid repellent property of the unexposed part in the photocatalyst containing layer is lowered, and furthermore, appearance of the lyophilic property in the exposed part becomes insufficient, and thus it is not preferable.

The photocatalyst containing layer used in this embodiment has the photocatalyst and binder as the main components. Since the binder used here is same as those of the embodiment to be coated on the base material, explained for the wettability changeable layer, explanation is omitted here.

For the photocatalyst containing layer in this embodiment, a surfactant can be contained further in addition to the photocatalyst and binder. Specifically, hydrocarbon based ones such as product name; NIKKOL BL, BC, BO, BB series manufactured by Nikko Chemicals Co., Ltd., fluorine based or silicone based nonionic surfactants such as ZONYL FSN, or FSO manufactured by Du Pont Kabushiki Kaisha, SURFLON S-141, or 145 manufactured by Asahi Glass Company, MAGAFAKKU F-141, or 144 manufactured by Dainippon Ink and Chemicals, Incorporated, FUTAGENT F-200, or F251 manufactured by Neos, UNIDYNE DS-401, or 402 manufactured by DAIKIN INDUSTRIES, Ltd., and FLUORAD FC-170, or 176 manufactured by 3M can be presented. Moreover, cationic surfactants, anionic surfactants, and amphoteric surfactants can be used as well.

Moreover, for the photocatalyst containing layer, in addition to the surfactants, oligomers and polymers, such as a polyvinyl alcohol, an unsaturated polyester, an acrylic resin, a polyethylene, a diallyl phthalate, an ethylene propylene diene monomer, an epoxy resin, a phenol resin, a polyurethane, a melamine resin, a polycarbonate, a polyvinyl chloride, a polyamide, a polyimide, a styrelene butadiene rubber, a chloroprene rubber, a polypropylene, a polybutylene, a polystyrene, a polyvinyl acetate, a polyester, a polybutadiene, a polybenzimidazol, a polyacrylic nitrile, an epichlorohydrine, a polysulfide, and a polyisoprene can be contained.

The content of the photocatalyst in the photocatalyst containing layer can be set in a range of 5 to 60% by weight, and preferably in a range of 20 to 40% by weight. Moreover, the thickness of the photocatalyst containing layer is preferably in a range of 0.05 to 10 μm.

The above-mentioned photocatalyst containing layer can be formed by dispersing the photocatalyst and the binder in a solvent, with the other additives as needed, so as to prepare a coating solution, and coating the coating solution. As the solvent to be used, an alcohol based organic solvent such as an ethanol, and an isopropanol is preferable. The coating operation can be carried out by a known coating method such as spin coating, spray coating, dip coating, roll coating and bead coating. When an ultraviolet ray curing type component is contained as the binder, the photocatalyst containing layer can be formed by executing a curing process by irradiating an ultraviolet ray.

6. Method for Manufacturing Color Filter

Finally, the method for manufacturing a color filter of the present invention will be explained. FIG. 9 shows an example of a color filter production process.

Figure 9A:
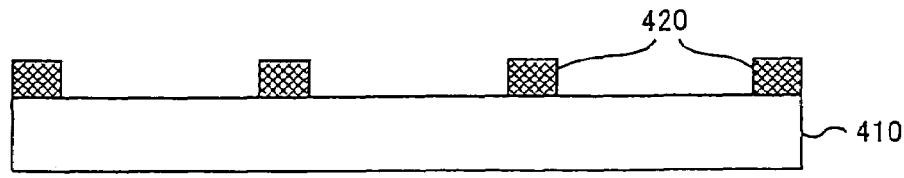
FIG. 9A-9D are a process diagram showing the manufacturing processes for a color filter using the same system.
Figure 9B:
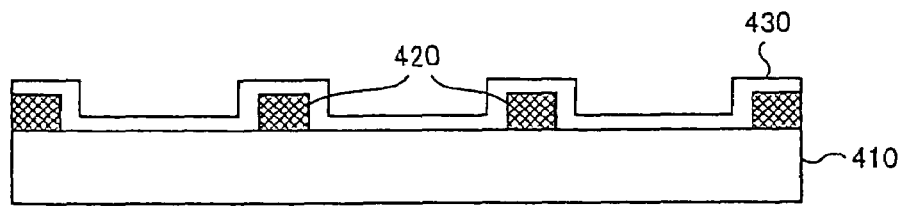
Figure 9C:
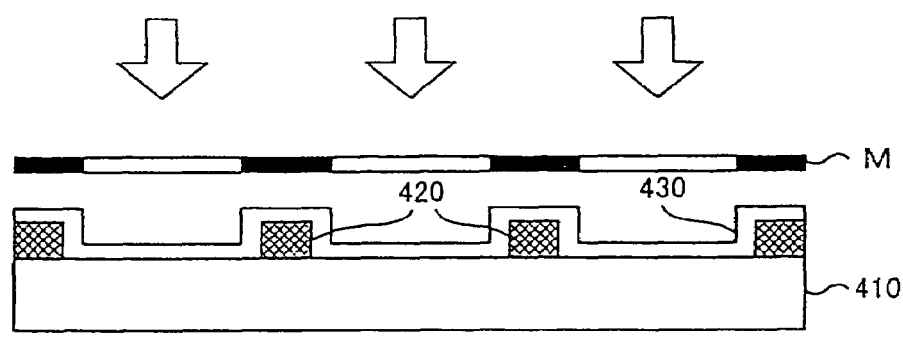
Figure 9D:
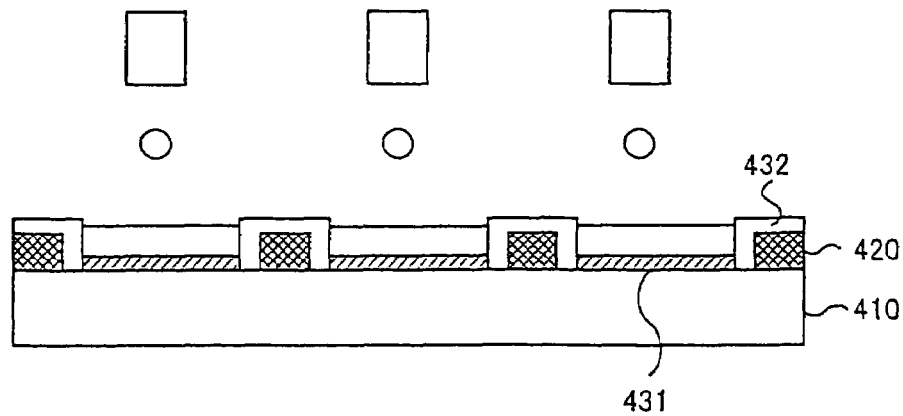

As shown in FIG. 9A, a black matrix 420 is formed on a transparent substrate 410 of a glass, or the like. Then, as shown in FIG. 9B, by coating a photocatalyst containing layer forming coating solution by the spin coating method, or the like, and curing, a photocatalyst containing layer 430 is formed. With a photo mask M located between a light source (not shown in the Fig.) and the photocatalyst containing layer 430 such that an ultraviolet ray is irradiated as a pattern in the area to have the coloring layer formed, a light beam is irradiated from the light source. Thereby, the part with the light irradiation in the photocatalyst containing layer 430 becomes a lyophilic area 431, and the part without the light irradiation becomes a water repellent area 432.

These processes are for manufacturing a substrate 400 used in the discharging system 1, and they are called a substrate adjusting process. In the process shown in FIG. 9D, with the substrate 400 accordingly produced placed on the stage 350 of the producing apparatus U3, the liquid droplets for forming the coloring layer are discharged from the piezoelectric driving type head unit 300 so as to form the coloring layer. At the time, since the liquid droplets discharged from each piezoelectric driving type head H1 to Hn are thinned out as needed, even when the discharging amounts of the piezoelectric driving type heads H1 to Hn differ, an even color filter without irregularity can be produced.

In the example of the above mentioned method for manufacturing a color filter, although the example using the photocatalyst containing layer as the second embodiment of the method for manufacturing a pattern forming body is shown, in the present invention, an embodiment using the wettability changeable layer shown in the first embodiment can be used as well.

As the coloring layer forming coating solution for forming the above mentioned coloring layer, it is not particularly limited as long as it is a coloring layer forming coating solution to be coated by an ink jet apparatus. Moreover, as the above mentioned black matrix, a metal thin film of a chromium, or the like, or a light blocking resin, or the like ordinarily used can be used.

In the method for manufacturing a color filter of the present invention, a color filter is produced by executing additional processes such as formation of a transparent electrode layer, and formation of a protection layer, as needed.

7. Modified Embodiment

The present invention is not limited to the above mentioned embodiments. The above-mentioned embodiments are examples, and for example the below-mentioned modification can be executed. Moreover, any one having the configuration substantially same as the technological idea disclosed in the claims of the present invention, and providing the same effects is included in the technological scope of the present invention.

(1) Although the ink jet apparatus in the above mentioned embodiments is explained as a part of the producing apparatus for a color filter, the present invention is not limited thereto, and it is of course adoptable in a printer apparatus for printing by discharging an ink to a recording medium such as a paper.

(2) Although the ink discharging is executed using the piezoelectric driving type heads H1 to Hn in the above mentioned embodiments, the present invention is not limited thereto, and a thermal ink jet type head for forming bubbles by heating a heater in the nozzle, and pushing out an ink by the bubbles can be used as well.

EXAMPLES

Formation of the Lyophilic Pattern onto the Transparent Substrate

A photocatalyst containing layer containing a photocatalyst and a binder was formed on a 300×400 mm non alkaline glass substrate. In this state, the wettability variable layer had the ink repellent property. By irradiating an ultraviolet ray via a linear mask pattern having a 90 μm×200,000 μm opening part, and 1,024 pieces of a 100 μm pitch, a lyophilic line pattern of the same pitch was formed on the photocatalyst containing layer.

Confirmation of the Ink Jet Discharging Amount

A piezoelectric driving type ink jet head having 128 pieces of discharging holes was prepared. The ink drop volume discharged from each discharging hole was measured so that it was found to be 20 pL/drop by average, 18 pL/drop by the smallest, and 22 pL/drop by the largest. That is, it was confirmed that there was ±10% irregularity with respect to the average discharging amount.

Bit Map Production

The discharging amount necessary for the color filter production was calculated based on the drop amount so that it was found out that 9,000 drops are needed for one line by the discharge from the discharging hole with the smallest discharging amount. Therefore, bit map data for 9,000 dots per one line, for 1,024 lines were produced. As the default, 90% of dots in the 9,000 dots for one line were provided as "1", and the remaining 10% of dots were provided as "0".

Bit Map Adjustment

The bit map data for all the lines were adjusted according to the discharging amount from each discharging hole of the ink jet. For example, in the case of the data of a line corresponding to the discharging hole smaller than the discharging amount average value by 5%, the dots to be "1" are increased by 5%, and in the case of the data of a line corresponding to the discharging hole larger than the discharging amount average value by 8%, the dots to be "1" are thinned out by 8%.

Ink Jet Coating, Production of the Color Filter

Based on the produced bit map data, a color filter manufacturing ink was discharged form the ink jet head so as to be impacted on the lyophilic pattern of the transparent substrate having the lyophilic pattern. The impacted ink wet and spread evenly in the lyophilic part. By curing and drying the same, a 1 μm film thickness linear color filter was produced. The film thickness difference of the each line was within ±1%.

The invention claimed is:

1. A pattern producing apparatus comprising:
a stage for placing a substrate,
a position adjusting mechanism for adjusting the relative positional relationship between the stage and a head unit comprising a plurality of integrated heads, and
a control section for discharging liquid droplets from each integrated head while thinning out the liquid droplet discharge of each integrated head according to a predetermined rule such that the liquid droplet amount per unit area to be impacted on the substrate is made even between each integrated head,
wherein forming the pattern on the substrate by discharging a plurality of liquid droplets from each head to the substrate while changing relative position of the head unit containing a plurality of integrated heads and the substrate, wherein the control section comprises a memory section for storing discharging position information, preliminarily determined for the each head, showing the position on the substrate of the liquid droplets to be impacted so that the liquid droplet discharged from the each head is controlled based on the discharging position information read out from the memory section, and further wherein the discharging position information is determined such that the position of thinning out the liquid droplet discharge is dispersed substantially even in the pattern formed on the substrate.

2. The pattern producing apparatus according to claim 1, wherein the head unit comprises a setting section capable of setting whether the discharging operation is valid or invalid for each head, and the control section produces setting information for controlling the setting section based on discharging position information and supplies the same to the setting section.

3. The pattern producing apparatus according to claim 1, wherein the each head comprises a common piezoelectric element, a common electrode and an individual electrode each corresponding to the each head are formed on the piezoelectric element, the control section comprises a driving pulse producing section for producing a driving pulse common to the each head and supplying the same to the common electrode, and the setting section controls whether the each individual electrode is to be grounded or opened based on the setting information.

* * * * *